US008515769B2

(12) United States Patent
Matten

(10) Patent No.: US 8,515,769 B2
(45) Date of Patent: Aug. 20, 2013

(54) SINGLE CHANNEL EVRCX, ISLP AND G.711 TRANSCODING IN PACKET NETWORKS

(75) Inventor: Alan H. Matten, Chicago, IL (US)

(73) Assignee: Alcatel Lucent, Paris (FR)

(*) Notice: Subject to any disclaimer, the term of this patent is extended or adjusted under 35 U.S.C. 154(b) by 744 days.

(21) Appl. No.: 12/655,991

(22) Filed: Jan. 11, 2010

(65) Prior Publication Data
US 2011/0172993 A1 Jul. 14, 2011

(51) Int. Cl.
G10L 19/00 (2006.01)
(52) U.S. Cl.
USPC .......................................... 704/500
(58) Field of Classification Search
USPC ................................. 704/500–504
See application file for complete search history.

(56) References Cited

U.S. PATENT DOCUMENTS

| 6,771,967 | B2 * | 8/2004 | Yang | 455/450 |
|---|---|---|---|---|
| 7,706,389 | B2 * | 4/2010 | Liu | 370/401 |
| 7,747,017 | B2 * | 6/2010 | Valentine et al. | 380/244 |
| 2001/0014609 | A1 * | 8/2001 | Yang | 455/450 |
| 2006/0115088 | A1 * | 6/2006 | Valentine et al. | 380/270 |
| 2008/0112407 | A1 * | 5/2008 | Liu | 370/389 |

FOREIGN PATENT DOCUMENTS

| WO | WO 2009/033344 | 3/2009 |
|---|---|---|
| WO | WO 2009/039676 | 4/2009 |

* cited by examiner

Primary Examiner — Michael N Opsasnick
(74) Attorney, Agent, or Firm — Carmen Patti Law Group, LLC

(57) ABSTRACT

An apparatus in one example comprises a receiver of a first mobile switching center. The receiver is configured to receive an input signal in a first encoding format. The input signal has an input payload. The first encoding format is a dual-mode InterSystem Link Protocol (ISLP)/Enhanced Variable Rate Coding (EVRC) codec. The apparatus further comprises a transcoder operatively coupled to the receiver. The transcoder is structured to transcode in a single channel the first encoding format to a second encoding format. The transcoder is configured to generate an output signal in the second encoding format for transmission over an internet protocol (IP) network to a second mobile switching center based on the input signal. The output signal has an output payload based on the input payload. The transcoder is configured to switch between a default voice handling mode for the EVRC codec and a clear channel mode for the ISLP codec to form the output payload.

10 Claims, 5 Drawing Sheets

SINGLE CHANNEL EVRCX, ISLP AND G.711 TRANSCODING IN PACKET NETWORKS

TECHNICAL FIELD

The invention relates generally to telecommunication systems, and more particularly to methods of transcoding between a dual-mode InterSystem Link Protocol/Enhanced Variable Rate CODEC (ISLP/EVRCx) (where EVRCx is either EVRC-A or EVRC-B) codec and a G711 codec in an Internet Protocol (IP) Packet Network.

BACKGROUND

A coder-decoder (CODEC) is essentially a data compression algorithm that selectively throws away information that it deems to be unimportant, while retaining the data that it deems necessary. The CODEC plays important role in the communications link. The CODEC must be robust enough to withstand a certain degree of data degradation during transmission. The better the CODEC is able to recover from bit errors, the more natural the reproduction will be over a wide range of conditions.

The original Code Division Multiple Access (CDMA) CODEC was not particularly robust, and as such it made even low Bit Error Rates audible to a discerning listener. CDMA providers began implementing a new CODEC called EVRC (which stands for Enhanced Variable Rate CODEC). EVRC permits more compressed signals (subscribers) to be stuffed into the same bandwidth. EVRC manages to produce reasonable audio quality in only 8 kilobits. Since individual EVRC users consume less bandwidth than users of the old CODEC, a CDMA "carrier" can accommodate more of them.

SUMMARY

Existing solutions for transcoding between a dual-mode InterSystem Link Protocol (ISLP)/EVRCx (where EVRCx is either EVRC-A or EVRC-B) codec and a G711 codec in an Internet Protocol (IP) Packet Network suffer from a variety of disadvantageous limitations. For example, such solutions for transcoding between dual-mode ISLP/EVRCx codec and a G711 codec require the usage of two distinct channels. That is, while ultimately packets containing EVRCx voice or ISLP datagrams are transcoded to Packets containing G.711 voice or ISLP adapted data encapsulated in G.711 packets, respectively, and similarly, packets containing G.711 voice or ISLP adapted data encapsulated in G.711 packets are to be transcoded to Packets containing EVRCx voice or ISLP datagrams respectively, two distinct channel are required to accomplish that task. One channel performs a packet to and from circuit function to transcode between EVRCx voice or ISLP datagrams and Time Division Multiplexing (TDM) data. A second channel performs a packet to and from circuit function to transcode between G.711 voice or ISLP adapted data encapsulated in G.711 packets and TDM data. A TDM network is required to connect the channel resources together. The two channels are connected via the TDM network to provide the overall solution.

Thus, current solutions suffer from drawbacks including: requiring two (2) channel resources to perform the overall solution, and requiring a TDM network to connect the channel resources together. In addition, the latency of each channel is on the order of 40 ms, so the overall latency for the two (2) channel solution is approximately 80 ms. For a mobile to mobile call using this solution at each end, the total latency will approach 340 ms which will contribute to a poor voice quality/user experience.

Embodiments provided herein implement the transformation between data formats within a single channel element. By enabling transcoding in a single channel, the software framework scheduling algorithm may be optimized to sequentially process each step of the transcoding operation. As a result, the latency contribution of the transcoding function may be reduced. Furthermore, the transcoding channel described herein is also independent of any TDM network, and thus can be used as a standalone solution in an IP Packet network.

One implementation provided herein encompasses an apparatus, which comprises: a receiver configured to receive an input signal in a first encoding format, the input signal having an input payload; and a transcoder operatively coupled to the receiver, the transcoder structured to transcode in a single channel the first encoding format to a second encoding format, the transcoder configured to generate an output signal in the second encoding format based on the input signal, the output signal having an output payload; and wherein the transcoder is configured to switch between providing encrypted data in the output payload and non-encrypted data in the output payload.

Another implementation encompasses an apparatus, which comprises: a receiver configured to receive a respective input signal having a respective payload in a first encoding format; and a transcoder that effects transcoding, in a single channel, of the first encoding format to a second encoding format, the transcoder configured to generate an output signal having a payload in the second encoding format based on the input signal, wherein the first encoding format is InterSystem Link Protocol (ISLP), and wherein the second encoding format is G.711.

A further implementation encompasses an apparatus, which comprises a first network system operatively coupled to a second network system via an IP network. The first network system has: a receiver, configured to receive an input signal having a payload in a first encoding format, that accepts a respective first signal having a respective payload in the first encoding format; a transcoder that effects transcoding, in a single channel, of the first encoding format to a second encoding format, the transcoder configured to generate a second signal having a payload in the second encoding format based on the input signal; and transmitter for sending the second signal on the IP network. The second network system has: a receiver, configured to receive an input signal having a payload in a first encoding format, that accepts the second signal from the IP network, the second signal having the respective payload in the second encoding format; and a transcoder that effects transcoding, in a single channel, of the second encoding format to the first encoding format, the transcoder configured to generate a further first signal having a payload in the first encoding format.

DESCRIPTION OF THE DRAWINGS

The features of the embodiments of the present method and apparatus are set forth with particularity in the appended claims. These embodiments may best be understood by reference to the following description taken in conjunction with the accompanying drawings, in the several figures of which like reference numerals identify like elements, and in which:

DETAILED DESCRIPTION

Figure 1:
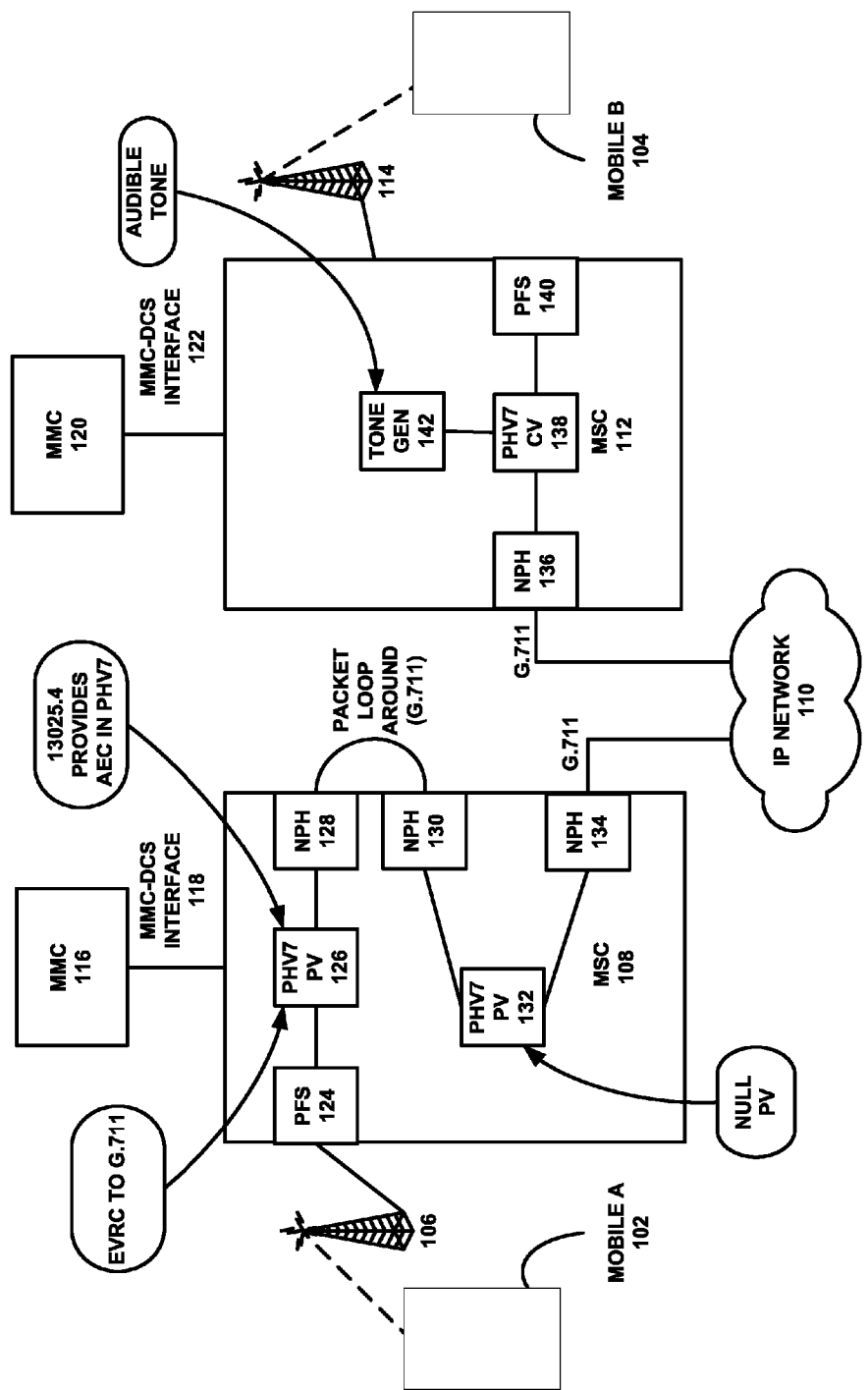
FIG. 1 depicts Mobile-to-Mobile call with G.711 in an example system.

The following abbreviations are used herein:
AEC acoustic echo control
API application programming interface
BSC base station controller
CDMA code division multiple access
CV circuit vocoders
DSP digital signal processor
DTMF dual tone multifrequency
EVRC enhanced variable rate coding
IOS inter-operability standard
IP Internet protocol
ISLP intersystem link protocol
MMC mobility manager center
MSC mobile switching center
NPH network protocol handler
OFI optical facility interface
PCM pulse code modulation
PFS packet frame selector
PHV7 protocol handler for voice
PS professional services
PV packet vocoder
SH speech handlers
TDM time division multiplexing
TS time slot
VT voice transparency
VTTS voice transparency transmission system According to the methods and apparatuses described herein, instead of performing ISLP encoding in one channel and transcoding between the TDM and G.711 in another channel, one single channel is utilized instead. A speech handler and a circuit vocoder are combined into a packet vocoder. A DTMF portion may be added on the circuit vocoder.

Embodiments according to the present method and apparatus provide, for example, a low-latency method to transcode between a dual-mode ISLP/EVRCx (where EVRCx is either EVRC-A or EVRC-B) codec and a G.711 codec in an Internet Protocol (IP) Packet Network. Packets containing EVRCx voice or ISLP datagrams may be transcoded to Packets containing G.711 voice or ISLP adapted data encapsulated in G.711 packets, respectively. Similarly, packets containing G.711 voice or ISLP adapted data encapsulated in G.711 packets may be transcoded to Packets containing EVRCx voice or ISLP datagrams, respectively.

One feature of the embodiments described herein is that both of two channel functions are combined into a single channel, the transformation between data formats taking place within the same channel element. Also, by combining both of the channel functions into a single channel, the software framework-scheduling algorithm is now optimized to sequentially process each step of the transcoding operation. Such optimization of the function reduces its latency contribution. In one example embodiment, this optimization will reduce the latency contribution of the function from 80 ms to 40 ms. The resultant combined transcoding channel is also now independent of any TDM networks, and can be used as a standalone solution in an IP Packet network. As another benefit, embodiments provided support an ISLP codec in an IP Packet network.

Embodiments of the present method and apparatus may have, for example, the following capabilities: Support for voice transparency feature for the packet loop-around and G.711 IP trunking configuration (International Federation for Information and Documentation (FID) 13025.3); Support for media negotiation only to G.711 for the mobile-to-mobile calls that are established between switches (requires G.711 between MSCs) (FID 13025.3); Provide the packet vocoder (PV) with the capabilities of performing "ISLP adaptation" or "reverse ISLP adaptation" for handling the VTTS calls (FID 13025.3); and Support for AEC on the PHV7 PVs (FID 13025.4).

FIG. 1 depicts Mobile-to-Mobile call w/G.711 in an example system, DURING ALERTING. Mobile A 102 communicates with mobile B 104 via a base station 106, a first MSC 108, an IP network 110, a second MSC 112 and a base station 114. The first MSC 108 is operatively coupled to a first MMC 116 via a MMC-DC8 interface 118. The second MSC 112 is operatively coupled to a second MMC 120 via a MMC-DC8 interface 122.

The first MSC 108 may have a PFS 124, which receives an input signal having a payload in a first encoding format. The PFS 124 is operatively coupled to a PV 126, for example PHV7 PV 126, which may for example convert EVRC to G.711. An EVRC packet stream may contain ISLP encrypted data. The PHV7 PV 126 may be operatively coupled to a series pair of NPH 128, 130 for packet loop around (G.711), followed by a PHV7 PV 132. The PHV7 PV 132 is operatively coupled to a NPH 134 that transmits an output signal having a payload in a second encoding format over IP network 110.

The second MSC 112 may have an NPH 136, which receives a signal from the IP network 110. The NPH 136 may be operatively coupled to a PHV7 CV 138, which may be operatively coupled to a PFS 140. The base station 114 may be operatively coupled to the PFS 140 in the second MSC 112.

Figure 2:
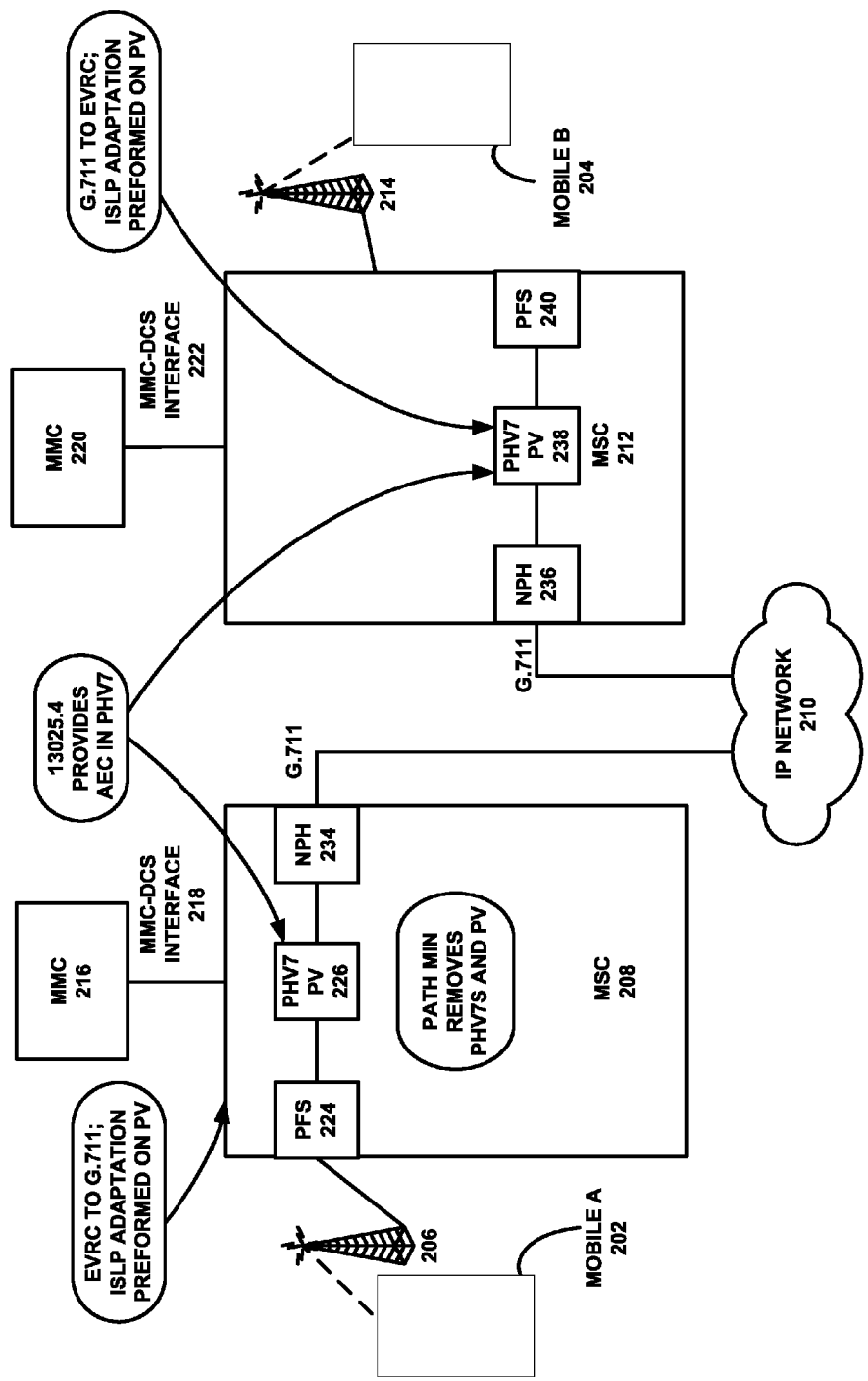
FIG. 2 depicts Mobile-to-Mobile call with G.711 in an example system, according to descriptions of methods and apparatuses described herein.

FIG. 2 depicts Mobile-to-Mobile call w/G.711 in an example system, TALKING according to an embodiment of the present method and apparatus. Mobile A 202 communicates with mobile B 204 via a base station 206, a first MSC 208, an IP network 210, a second MSC 212 and a base station 214. The first MSC 208 may be operatively coupled to a first MMC 216 via a MMC-DC8 interface 218. The second MSC 212 may be operatively coupled to a second MMC 220 via a MMC-DC8 interface 222.

The first MSC 208 may have a PFS 224, which receives an input signal having a payload in a first encoding format. The PFS 224 may be operatively coupled to a PHV7 PV 226, which may for example convert EVRC to G.711. The PHV7 PV 226 may be operatively coupled to a NPH 234 that transmits an output signal having a payload in a second encoding format over IP network 210.

The second MSC 212 may have an NPH 236, which receives a signal from the IP network 210. The NPH 236 may be operatively coupled to a PHV7 PV 238, which may be operatively coupled to a PFS 240. The base station 214 may be operatively coupled to the PFS 240 in the second MSC 212.

Embodiments according to the descriptions provided herein may include one or more of the following:

Supported MSC, such as integrated MSC, single-DCS and multiple-DCS;

Supported PS platform, such as PS and PS-C platforms;

Supported PHV, PHV6 (PFS) and PHV7 (PFS, PV, and CV);

Supported call origination and call termination (with 'conditional' loop-around capability such as that implemented by Transcoder Free Operation/Remote Transcoder Operation (TrFO/RTO) features);

Supported media negotiation only to G.711 for calls established between PSs;

Supported bearer interworkings, such as, pkt-in to pkt-out, pkt-in to ckt-out, ckt-in to pkt out, and ckt-in to ckt-out;

Supported transcoding capabilities, such as, EVRC-to-G.711, G.711-to-EVRC, G.711-to-G.711, EVRC-to-PCM, PCM-to-EVRC, PCM-to-G.711, G.711-to-PCM;

An example scenario of one embodiment is as follows:

The following pre-conditions apply to the example scenario: an EVRC call has been successfully established between mobile A and mobile B; the established call is not involved in any service; and A and B decide to apply VT to the call, and both A and B push the VT button.

The serving BS receives a VT request message (i.e., ServiceRequestMsg) (e.g., 80b0H or 80a0H) from the traffic channel.

If the associated Feature Control (FAF) is enabled, the serving BS sends a VT Service Request message (e.g., FS_Transport message) to the PS via the Cell-PS interface.

Upon receipt of the VT Service Request message from the serving BS, PS would verify if this is a SH call (SH assigned) or a PFS call (PFS assigned). If it is a PFS call, PFS would transparently transfer the received data (VTTS-encrypted data) to the egress side.

If this is a PFS call, the inserted Packet or Circuit Vocoder (PV or CV) will be notified of the VTTS mode change. In this example, PV should perform ISLP adaptation and should convert EVRC to G.711 (for PV) or TDM (for CV). The ISLP-adapted data stream would then be transmitted to the network.

PS would then return with an ACK message (FS_Transport message) to the serving BS.

The SH calls may follow the mechanism developed by FID 13025.2. Failure scenarios may follow the mechanism developed by FID 13025.2.

A Null PV (if inserted) transparently transfers the data received from the ingress side to the egress side.

Upon receipt of the ISLP-adapted data stream, CV (if inserted) may process the data based on the codec used by the opposite side (Supported in FID 13025.2). If the opposite side uses un-compressed codec (e.g., G.711 or PCM), CV should transparently send the ISLP-adapted data to the egress side, and should switch to the 'Clear Channel' mode. If the opposite site uses compressed codec (e.g., EVRC), CV should perform reverse ISLP adaptation and then send the "VTTS-encrypted data" to the egress side.

In addition, the PS call processing may be notified of the VTTS mode change (for debugging purpose).

For FID 13025.4, support may be added of AEC on PHV7 PV's as follows:

Use same AEC algorithm currently deployed for SH and CV channels on PHV7;

Support EVRC to and from G711 PV type (no capacity degradation);

Support usage of AEC on both sides of a PV; near-end (EVRC side) cancels acoustic echo from Mobile, and far-end (G711 side) cancels acoustic echo from Mobile/PHS on other side of the network if no AEC enabled on other side of the network;

Added to FC/PS/DSP interfaces for PV call setup and PV switch codec;

New provisioning field to enable PV's; near-end (EVRC-side of PV) enable (near-end bulk delay (60-800 ms), and near-end echo path dispersion (5-200 ms));

Far-end feature (G711-side of PV) enable; far-end feature Bulk Delay (e.g. 60-800 ms), and far-end feature echo path dispersion (e.g., 5-200 ms)); and AEC is automatically disabled for calls in VTTS mode.

Figure 3:
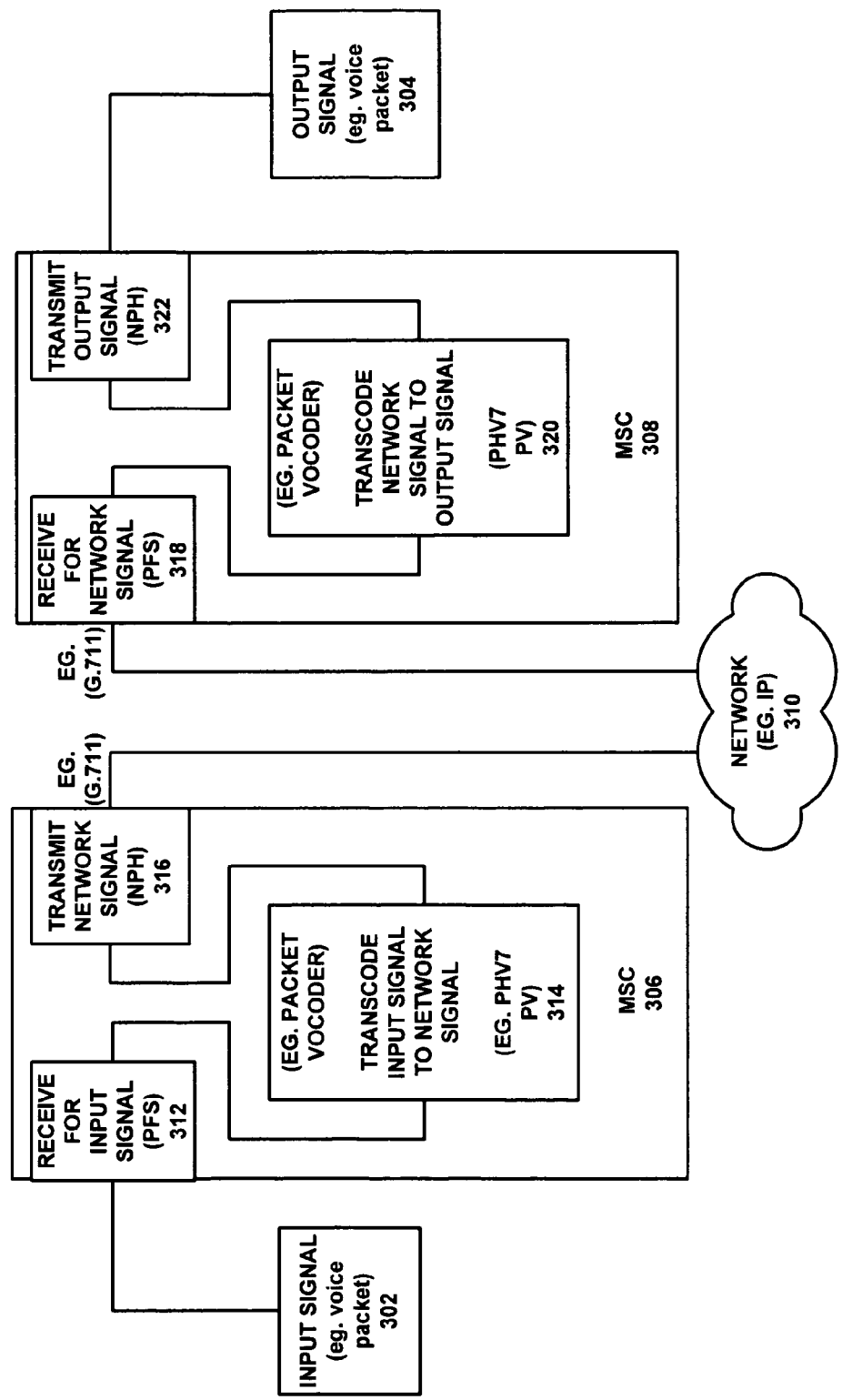
FIG. 3 is a general diagram of an embodiment according to the descriptions of the method and apparatus described herein.

FIG. 3 is a general diagram of an embodiment according to methods and apparatuses described herein. A first MSC 306 is operatively coupled to a second MSC 308 via a network 310, which may be for example an IP network. The first MSC 306 may have a receive module, for example a PFS, that receives an input signal 302. The input signal 302 may, for example, have voice packets. The receive module 312 may be operatively coupled to a transcode module 314 that is operatively coupled to a transmit module 316. The transcode module may be, for example, a packet vocoder. The transmit module may be, for example, an NPH. An output signal from the transmit module 316 may be in the G.711 format.

The second MSC 308 may have corresponding components receive module 318, transcode module 320 and transmit module 322 that provides an output signal 304 that may have, for example, voice packets. Of course, for transmission of signals in the opposite direction functions of the modules are correspondingly reversed.

The above-described switching function of the transcoder is described in the embodiments of the packet vocoder/transcoder paradigm. However, embodiments may alternatively use a DTMF method of triggering the switch in a TDM-to-packet/packet-to-TDM paradigm. Embodiments may further include voice transparency.

In general Speech Handlers (SHs) are used for all mobile calls. The TrFO feature is turned on for the MSC but no cells have TrFO active. SHs provide acoustic echo cancelling for the near end mobile. G.711/IP trunking is provided by using Circuit Vocoders (CVs) to interwork circuit-to-packet and by using NPHs to connect to the packet network. CVs are setup using the existing G.711 codec. Interaction with VTTS described later. For the traditional MSC configuration, loop-around circuit trunks are used at both the originating MSC and the terminating MSC to connect the SHs to the CVs. The terminating MSC treats all calls as "circuit redirection". For the IOS configuration, A2 trunks are used at both the originating MSC and the terminating MSC in place of loop-around trunks.

Figure 4:
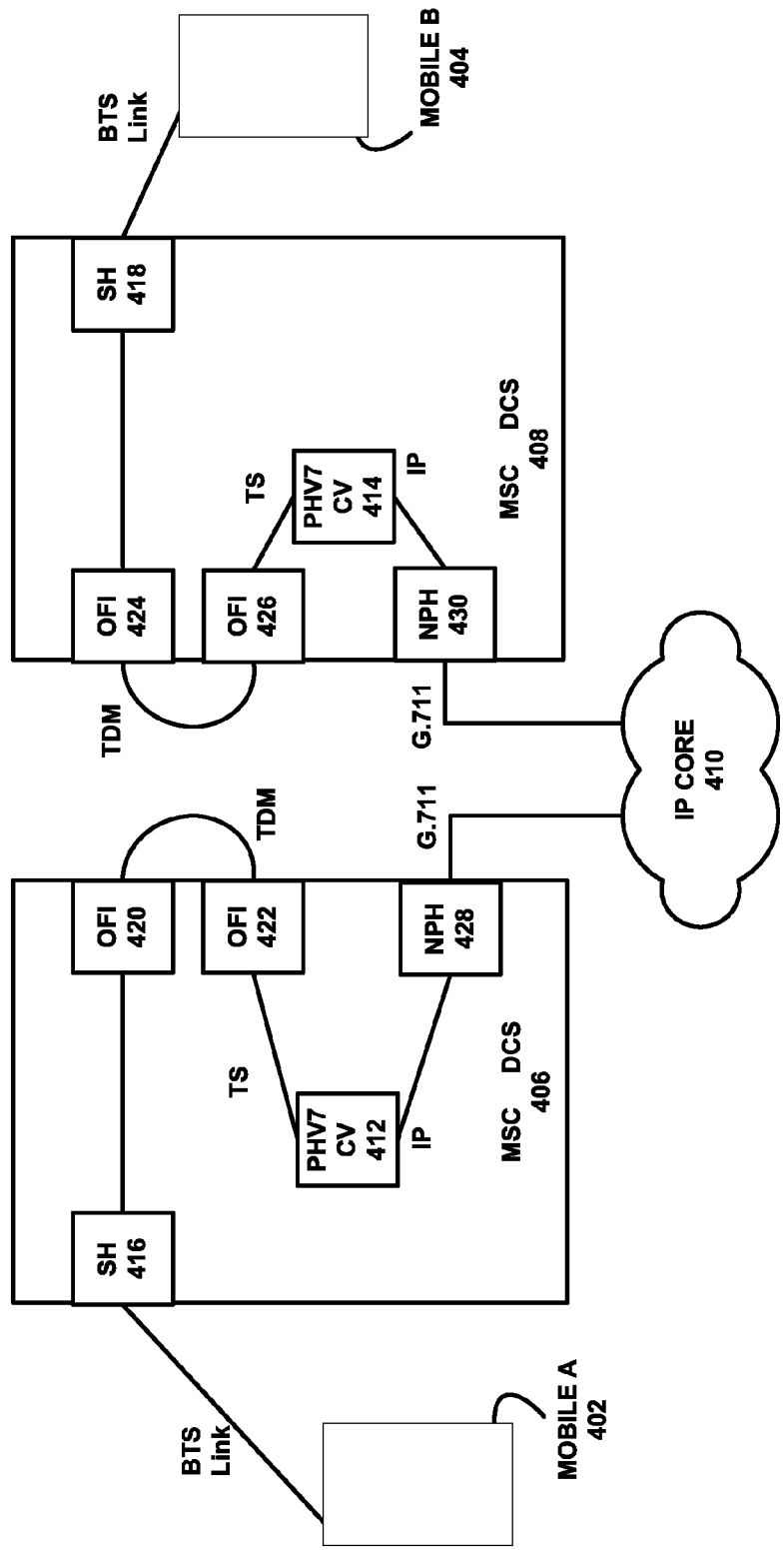
FIG. 4 depicts a mobile-to-mobile bearer path example for an MSC.

FIG. 4 depicts a mobile-to-mobile bearer path example for an MSC. Communication is provided in this example between mobile A 402 and mobile B 404.

An INCALL or first MSC 406 performs an HLR query and routes calls to at least a second MSC 408 over an IP core 410 (e.g., via Top Level Domain Name (TLDN) routing). CVs 412, 414 are setup at call establishment time with a standard G.711 codec. The CVs 412, 414 provide echo cancellation, gain adjustment, etc. and may be PHV7 CVs. The terminating or second MSC 408 treats all incoming packet calls via "circuit redirection".

Each MSC 406, 408 has a SH 416, 418 operatively coupled to a series pair of OFIs 420, 422 and 424, 426, which are in turn operatively coupled to the PHV7 CV 412, 414 that in turn is operatively coupled to the NPH 428, 430. The NPHs 428, 430 are operatively coupled to the IP core 410.

Figure 5:
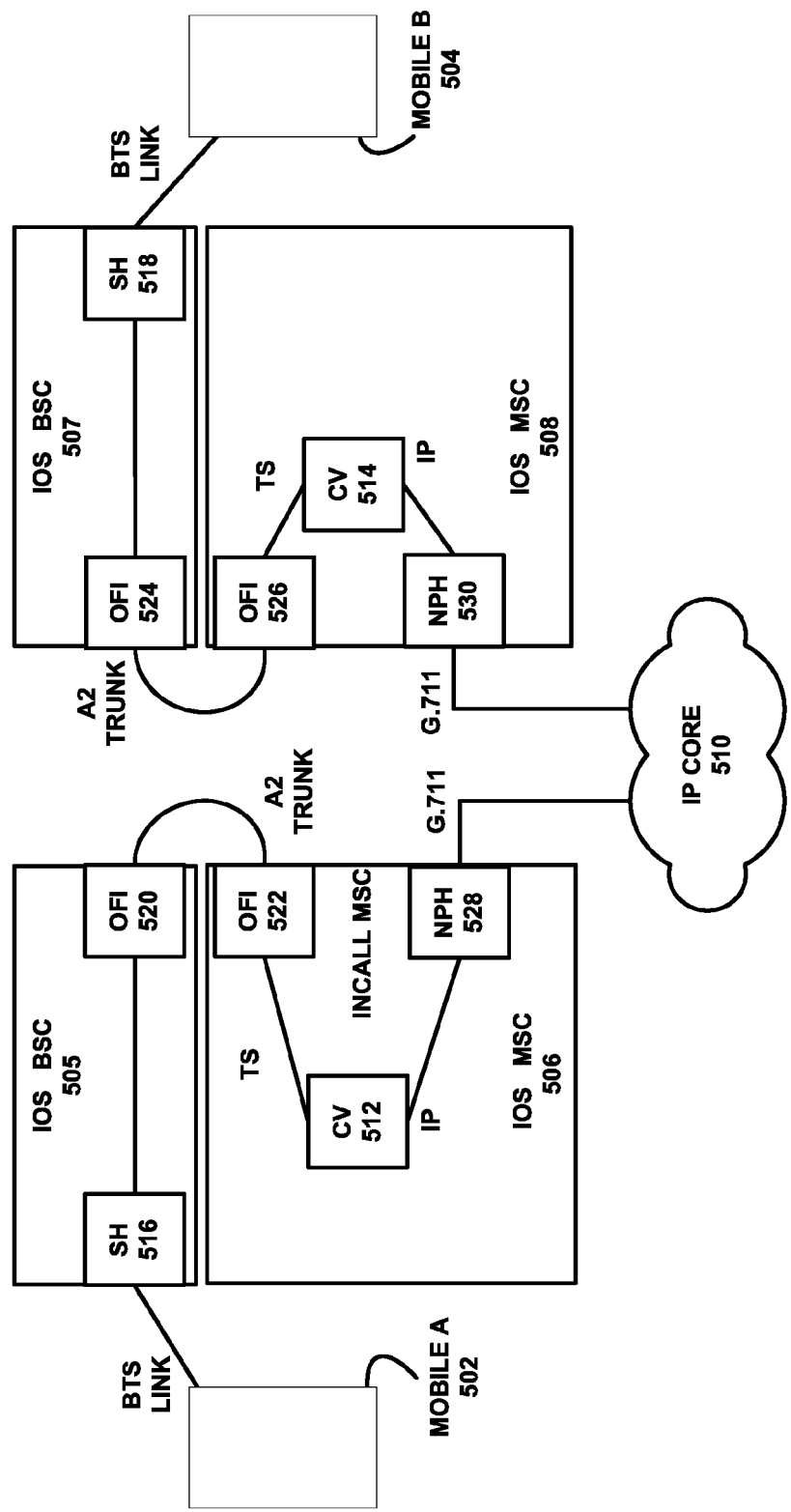
FIG. 5 depicts a Mobile-to-Mobile Bearer Path example for an IOS BSC/MSC.

FIG. 5 depicts a Mobile-to-Mobile Bearer Path example for an IOS BSC/MSC. Communication is provided in this example between mobile A 502 and mobile B 504. A first IOS BSC 505 is operatively coupled to a first IOS MSC 506. Signals from mobile A 502 are received at the SH 516, which is operatively coupled to an OFI 520. The OFI 520 in the IOS BSC 505 is operatively coupled to an OFI 522 in the IOS MSC 506 by a trunk. The OFI 522 in the IOS BSC 505 is operatively coupled to a CV 512, which is operatively coupled to an NPH 528.

The second IOS BSC 507 similarly has a SH 518 and an OFI 524. The second IOS MSC 508 similarly has an NPH 530, a CV 514 and an OFI 526. The NPHs 528, 530 are operatively coupled to an IP core 510.

For initial deployment, when VTTS is invoked, all transcoding and echo cancellation in the voice path may be disabled and ISLP supported. For the traditional MSC, a hard handoff will be made from the initial SH to a SH on a PHV6 which supports ISLP for VTTS. MSCs are equipped primarily with PHV7 SHs and a few PHV6 SHs for VTTS support. For the IOS BSC, a non-hard handoff solution may be provided where the initial SH switches to an ISLP mode upon VTTS activation. IOS BSCs may only be equipped with PHV6 SHs.

The CVs must also change to a "clear channel" mode where no echo cancellation or gain adjustments are done. The CV cannot be setup initially in clear channel mode as it must support echo cancellation for scenarios where the CV is connected to a TDM network as a result of some feature interaction, such as call transfer, etc.

Since the CVs are part of a call independent from the mobile (SH) portion of the call (e.g., isolated by a loop-around trunk or an A2 trunk), no signaling or internal control messaging option is possible for changing the mode of the CV to a clear channel. Two in-band DTMF tones may be used to cause the CV to change to clear channel mode. These may be 2 hard-coded digits from the A-D DTMF range. A two digit combination may be used as a single A through D digit that may be used by certain network nodes or applications, such as voice mail systems. CVs may be modified to recognize this 2 digit pattern and change to a clear channel mode.

The following example is a high level VTTS scenario (Traditional MSC). The mobile user pushes the VTTS button. The MSC is notified of the button push via a request utilizing existing functionality. The MMC instructs the PS to allocate the new SH. After a new SH is allocated, the MMC instructs the PS to reconfigure the path using a "Switchpath" message.

When the PS gets the "Switchpath" message, the PS uses a Local Switching Demand and Facility Data base system (LDSF) to generate the two DTMF combination in the A-D range, according to one embodiment. After the tone generation, the PS will continue with the "Switchpath" processing and the completion of the hard handoff.

The CV may be programmed to recognize the two-digit combination and change from a normal G.711 mode to a clear channel mode, according to another embodiment.

The following example is a high level VTTS scenario (IOS BSC). The mobile user pushes the VTTS button. The BSC is notified of the button push via a message, for example a FS_TRANSPORT message, to the SH. Prior to beginning normal VTTS processing, the SH generates the two DTMF digit combination in the A-D range. After the tone generation, the SH will continue with transition to the VTTS mode.

The CV in the MSC may be programmed to recognize the two-digit combination and change from a normal G.711 mode to a clear channel mode, according one embodiment.

In another embodiment, the circuit trunk loop around may be ISDN User Part (ISU)P. In such an embodiment, the clear channel codec transparently passes frames between the time slot and an RTP stream.

The switch or switch module referred to above may be in the packet vocoder. There may be at least four triggers to invoke the packet vocoder's switch module. For example, in the embodiments depicted in FIGS. 1 and 2, triggering may be effected by the MMCs 116, 120, 216, 220, or by detection of ISLP data by the PV 126, 226. In the FIGS. 4 and 5 embodiments triggering may be effected by DTMF digits sent by the SH 416, 516 and detected by the CV 412, 512, or by detection of ISLP data by the CV 412, 512.

It is to be understood that although the above-described embodiments refer to clear-channel data that is non-encrypted, the embodiments according to the present method and apparatus may also use clear-channel data that is still in an encrypted format. Such clear-channel data may be encapsulated in G.711 packets and remains unaltered by the clear-channel element.

Embodiments of the present method and apparatus have many efficiencies/advantages provided by the packet vocoder/transcoder approach. Embodiments may provide lower latency, and require fewer signal processing resources compared to a system that requires a separate signal processing resource to handle each encoding format as well as an intermediate bearer network to connect the individual signal processing resources. Also, fewer signal-processing resources result in higher channel capacity per unit of hardware, which translates to lower cost per channel.

Furthermore, the present packet vocoder/transcoder approach may also be switched dynamically to change its profile so that it switches from its "normal" voice processing profile to its encrypted ISLP+ClearChannel G.711 profile. Dynamic switching of the signal processing profiles is also faster since all four signal processing profiles (EVRC, G711, Encrypted ISLP, and ClearChannel) are managed as one packet vocoder/transcoding channel.

Although the depicted embodiments of the present method and apparatus use ISLP over EVRC to G.711/ClearChannel, other encrypted format types may be utilized, such as, HDLC, that are carried over any voice/audio codec packet format (EVRC-B, AMR, GSM-EFR, G.723, G.729ab, G.726, etc.) with the G.711/ClearChannel on the other side. Embodiments may also use un-encryption by the packet vocoder/transcoder and re-encoding into another non-encrypted voice/audio codec format. Also, embodiments may also use un-encryption by the packet vocoder/transcoder and re-encoding into another different encrypted format, and encapsulation as G.711 packets in clear channel mode.

The present apparatus in one example may comprise a plurality of components such as one or more of electronic components, hardware components, and computer software components. A number of such components may be combined or divided in the apparatus.

The present apparatus in one example may employ one or more computer-readable signal-bearing media. The computer-readable signal-bearing media may store software, firmware and/or assembly language for performing one or more portions of one or more embodiments. The computer-readable signal-bearing medium for the apparatus in one example may comprise one or more of a magnetic, electrical, optical, biological, and atomic data storage medium. For example, the computer-readable signal-bearing medium may comprise floppy disks, magnetic tapes, CD-ROMs, DVD-ROMs, hard disk drives, and electronic memory. In another example, the computer-readable signal-bearing medium may comprise a modulated carrier signal transmitted over a network comprising or coupled with the apparatus, for instance, one or more of a telephone network, a local area network ("LAN"), a wide area network ("WAN"), the Internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

I claim:

1. An apparatus, comprising:
    a receiver, of a first mobile switching center, configured to receive an input signal in a first encoding format, the input signal having an input payload and wherein the first encoding format is a dual-mode InterSystem Link Protocol (ISLP)/Enhanced Variable Rate Coding (EVRC) codec; and
    a transcoder operatively coupled to the receiver, the transcoder structured to transcode in a single channel the first encoding format to a second encoding format, the transcoder configured to generate an output signal, in the second encoding format for transmission over an internet protocol (IP) network to a second mobile switching center, based on the input signal, the output signal having an output payload based on the input payload and wherein the second encoding format is a G.711 codec; and
    wherein the transcoder is configured to switch between a default voice handling mode for the EVRC codec and a clear channel mode for the ISLP codec to form the output payload;
    wherein the switching between the default voice handling mode and the clear channel mode is based on a trigger;
    wherein the trigger is a sequence of Dual Tone MultiFrequency (DTMF) digits that occur in band in a bearer stream to effect switching between the default voice handling mode and the clear channel mode.

2. The apparatus according to claim 1, wherein the transcoder is a packet vocoder and wherein the single channel is a transcoding channel.

3. The apparatus according to claim 1, wherein the input payload is encapsulated in G.711 packets in the clear channel mode.

4. The apparatus according to claim 1, wherein the input signal is in a Time Division Multiplexing (TDM) domain in a TDM stream, and wherein the apparatus further comprises a DTMF tone decoder, and wherein in a TDM to packet direction DTMF tones are detectable by the DTMF tone decoder, and wherein in a packet to TDM direction packets are unpacked and converted back to a TDM stream.

5. The apparatus according to claim 1, wherein in the clear channel mode the input payload is unaltered.

6. The apparatus according to claim 1, wherein in the default voice handling mode the input payload is subject to signal processing.

7. An apparatus, comprising:
    a receiver, of a first mobile switching center, configured to receive a respective input signal having a respective payload in a first encoding format and wherein the first encoding format is a dual-mode ISLP/EVRC codec; and
    a transcoder that effects transcoding, in a single channel, of the first encoding format to a second encoding format, the transcoder configured to generate an output signal having a payload in the second encoding format for transmission over an internet protocol (IP) network to a second mobile switching center, based on the input signal and wherein the second encoding format is a G.711 codec;
    wherein the transcoder is configured to switch, based on a trigger, between a default voice handling mode for the EVRC codec and a clear channel mode for the ISLP codec to form the output payload;
    wherein the trigger is a sequence of Dual Tone Multifrequency (DTMF) digits that occur in band in a bearer stream to effect switching between the default voice handling mode and the clear channel mode.

8. The apparatus according to claim 7, wherein the transcoder is a packet vocoder and wherein the single channel is a transcoding channel.

9. An apparatus, comprising:
    a first network system operatively coupled to a second network system via an Internet Protocol (IP) network;
    the first network system having:
    a receiver of a first mobile switching center in the first network system, operatively coupled to the second network system via an Internet Protocol (IP) network, the receiver configured to receive an input signal having a payload in a first encoding format, that accepts a respective first signal having a respective payload in the first encoding format, wherein the first encoding format is a dual-mode InterSystem Link Protocol (ISLP)/Enhanced Variable Rate Coding (EVRC) codec;
    a transcoder that effects transcoding, in a single channel, of the first encoding format to a second encoding format, for transmission over an internet protocol (IP) network to the second mobile switching center, the transcoder configured to generate a second signal having the payload in the second encoding format based on the input signal, wherein the second encoding format is a G.711 codec; and
    a transmitter for sending the second signal on the IP network;
    wherein the transcoder of the first network system is configured to switch, based on a trigger, between a default voice handling mode for the EVRC codec and a clear channel mode for the ISLP codec to form the output payload;
    wherein the trigger is a sequence of Dual Tone MultiFrequency (DTMF) digits that occur in band in a bearer stream to effect switching between the default voice handling mode and the clear channel mode;
    the second network system having:
    a receiver, configured to receive, from the IP network, the second signal having the payload in the second encoding format; and
    a transcoder that effects transcoding, in a single channel, of the second encoding format to the first encoding format, the transcoder configured to generate a further first signal having a payload in the first encoding format.

10. The apparatus according to claim 9, wherein the transcoder is a packet vocoder and wherein the single channel is a transcoding channel.

* * * * *